United States Patent [19]

Linhoff et al.

[11] Patent Number: 5,131,220
[45] Date of Patent: Jul. 21, 1992

[54] EXOTHERMIC CHEMICAL REACTION PROCESSES

[75] Inventors: Bodo Linnhoff, Bowdon; Johan E. De Leur, Stockport; Bruce L. Pretty, Withington, all of United Kingdom

[73] Assignee: National Research Development Corporation, London, England

[21] Appl. No.: 470,635

[22] Filed: Jan. 26, 1990

Related U.S. Application Data

[63] Continuation of PCT/GB88/00619, Jul. 28, 1988.

[30] Foreign Application Priority Data

Jul. 29, 1987 [GB] United Kingdom ............... 8717979
Feb. 12, 1988 [GB] United Kingdom ............... 8803251

[51] Int. Cl.$^5$ ............................................. F02C 7/00
[52] U.S. Cl. ................................... 60/39.02; 60/39.07
[58] Field of Search ............... 60/39.02, 39.12, 39.182, 60/39.03, 39.04, 39.05, 39.07

[56] References Cited

U.S. PATENT DOCUMENTS

| | | | |
|---|---|---|---|
| 3,203,175 | 8/1965 | Michalicka et al. | 60/39.182 |
| 3,765,167 | 10/1973 | Rudolph et al. | 60/39.182 |
| 3,798,898 | 3/1974 | Delahaye | 60/39.12 |
| 4,095,419 | 6/1978 | Pfenniuner | 60/39.12 |
| 4,099,374 | 7/1978 | Foster-Pegg | |
| 4,676,063 | 6/1987 | Goebel et al. | 60/39.12 |

FOREIGN PATENT DOCUMENTS

3520096 A1 1/1986 Fed. Rep. of Germany .
1146292 3/1969 United Kingdom .

OTHER PUBLICATIONS

Robertson et al. "Second-Generation PFB . . ." Presented at EPRI Conference, Published Abstract 2-5, May 1988, pp. 1-19.
Robertson "Key Components for a High-Efficiency . . ." 9th Intl Conference on FBC, 1987, Boston, pp. 1013-1020.

Primary Examiner—Louis J. Casaregola
Attorney, Agent, or Firm—Nixon & Vanderhye

[57] ABSTRACT

An exothermic chemical process carried out above atmospheric pressure, in which a first pressurized gas stream from the process and a second pressurized fluid stream containing an excess of high temperature heat from the process is passed through a heat exchanger to heat the first pressurized gas with a portion of the excess high temperature heat, and the heated first pressurized gas is expanded to generate work. An additional amount of pressurized gas and at least a portion of the second pressurized fluid stream is passed through a heat exchanger to heat the additional amount of pressurized gas with another portion of the excess high temperature heat contained in the second pressurized fluid stream, with the additional amount of pressurized gas being independent to the amount required or produced by the process. The heated additional amount of pressurized gas is expanded to generate work, with the additional amount of pressurized gas being such that the total amount of gas expanded is greater than the amount of gas which would have been available for expansion without supplying the additional amount of pressurized gas.

21 Claims, 11 Drawing Sheets

$$P_2 = P_3 + \Delta P \text{ process} + \Delta P_{HX}$$
$$P'_2 = P_3 + \Delta P'_{HX} (\Delta P \text{ process eliminated})$$
$$(\text{or } P'_2 = P_3 + \Delta P_{HX})$$

EXOTHERMIC CHEMICAL REACTION PROCESSES

This application is a continuing application under 35 USC 363 of International Application No. PCT/GB88/00619, filed on 28 Jul. 1988.

The present invention relates to exothermic chemical reaction processes in which work is generated (e.g. to produce electrical power) by expansion of hot gas from the reaction.

The invention relates particularly to exothermic chemical reaction processes which are effected at elevated pressures (i.e. above atmospheric pressure) and which generate product or intermediate gas streams at high temperatures and elevated pressures. There are many such processes operated industrially including air based chemical reactions, for example the oxidation of ammonia in nitric acid production and the oxidation of sulphur in the production of sulphuric acid.

BACKGROUND OF THE INVENTION

A feature of all such processes which is relevant to the present invention is that they include compression of feed gas (i.e. the gas(es) which take part in the reaction), intermediate gas or recycle gas and generation of work by expansion of a hot process effluent or intermediate gas stream, e.g. in a power recovery turbine.

The output of the power recovery turbine may be used to provide any form of shaftwork including, but not limited to, internal process compression requirements, external compression requirements, or electrical power generation. The effluent or intermediate gas stream may undergo a temperature boost prior to entry into the power recovery turbine to increase power recovery efficiency. Whether or not this high temperature boost occurs, the processes also feature an excess of high temperature heat (as defined in the following paragraph) which cannot be accommodated in the process effluent or intermediate gas stream and which is suitable for power generation by other mechanisms (e.g. production of steam for expansion in a power recovery turbine).

To define 'excess high temperature heat' it is necessary firstly to refer to 'excess process heat'. This can only be defined rigorously by referring to 'Pinch Technology' techniques described, for example, in 'User Guide on Process Integration for the Efficient Use of Energy', I Chem E,. Rugby, UK, 1982. There is an 'excess process heat' when the combined heating capability, between the 'Hot Pinch temperature' and a temperature of ambient plus $\Delta T min$, of process streams and reactors which require cooling to meet and/or maintain process operating conditions (i.e. the enthalpy change of the Hot Composite Curve between these two temperature levels) is greater than the combined heating requirement, between the 'Cold Pinch temperature' and ambient temperature, of process sreams which require such heating to meet and/or maintain process operating conditions (i.e. the enthalpy change of the Cold Composite Curve between these two temperature levels). $\Delta T min$ is the minimum temperature difference for heat transfer between process streams allowable for the system. This excess process heat may be used to heat so-called cooling utilities such as cooling water, air, or boiler feed water.

There is an 'excess of high temperature heat' if the 'excess process heat' is at a sufficiently high temperature level to allow the cooling utility to be heated so that it becomes useful for power production. For example, in the case where the cooling utility is boiler feed water, the 'excess high temperature heat' would be sufficient to generate steam which could be expanded through a steam power turbine to generate useful work prevailing in the plant but may be rigorously determined by thermodynamic techniques. The most definitive and important of these techniques is Pinch Technology (or Process Integration). These particular techniques are described, for example, in "User Guide on Process Integration for the Efficient Use of Energy" I. Chem. E. Rugby, U. K., 1982.

The plants for commercial operation of all such processes are designed to operate under a so-called 'full load' condition. This is the condition in which the plant is operating with either the maximum possible flow rate (compatible with the design of the plant) of feed gas to the reactor or the maximum possible production rate of products from the plant, whichever of these two criteria is economically or operationally the more beneficial. In the full load condition there will be a particular amount of feed gas required by the reactor and particular amounts of intermediate, effluent or product gases. Thus there will be a maximum amount of gas from the reaction which is available for expansion for generating work.

SUMMARY OF THE INVENTION

It is an object of the present invention to provide an exothermic chemical reaction process in which the amount of work generated is enhanced as compared to prior art processes.

According to the present invention there is provided an exothermic chemical reaction process carried out above atmospheric pressure in a plant designed to operate under a predetermined full load condition and in which operation of the process results in production of an excess of high temperature heat a portion of which is used to heat a pressurised gas from the reaction which is then expanded to generate work wherein an amount of pressurised gas supplementary to that required or produced by the process is heated by a portion of the available excess high temperature heat and expanded to generate additional work, the amount of such supplementary gas being such that the total amount of gas expanded is greater than that amount which would be available for expansion by operating the process at the full load condition without supplying the supplementary gas.

Thus in contrast with the prior art in which the amount of work generated is wholly dependent on the amount of gas produced or required by the process in the full load condition, the invention involves the use of an amount of additional gas which is independent of that produced or required at full load. Generally the additional amount of gas is such as to increase the gas available for expansion by at least 10%, preferably at least 20%, more preferably at least 30%, and most preferably 40% as compared to the case where no supplementary gas is provided. Generally the additional amount will be 10-200%, preferably 10-100% (e.g. 20-100%). Consequently a greater amount of heated gas is passed to the expander (e.g. a power recovery turbine) resulting in an increased amount of work output. This increase will be dependent on the amount of the additional gas which will in turn be dependent on the amount of excess high temperature heat available for heating additional gas to temperatures which make it suitable for expansion for generating work. The amount of such available excess high temperature heat may be determined by Process Integration techniques.

The exothermic reactions with which the invention is principally concerned take place at 500°-1500° C. (e.g. 600°-1000° C.) and the temperature at the inlet to the expander will therefore also be in this range, more preferably 600°-850° C. The gas expander will preferably have an expansion ratio of 3:1 to 20:1. Compression ratios for the additional gas are preferably also in the range 3:1 to 20:1.

Any suitable gas may be used as the additional gas and ideally, of course, is one of low cost. The additional gas is preferably one which is compatible with the hot gases to be expanded so that they may be admixed therewith for expansion together. It is however also possible for the two sets of gases to be heated and expanded separately.

Most preferably the additional gas is also a feed gas for the reaction. The invention is applicable particularly to air based reactions, in which air is a feed gas for the reaction, and the additional gas is also air.

A particular example of such an air based reaction to which the invention is applicable is the production of nitric acid by the oxidation of ammonia. For such a process it is possible to define a process air requirement at 100% capacity (i.e. full load condition) which is the amount of air required by the reaction to achieve the desired conversion efficiency (usually 94-97%) plus the amount of bleaching air (required for reducing $NO_x$ emissions). For such a process the amount of additional air will typically be 20-100% (e.g. 20-75%) of the process air requirement.

As a first modification of the process thus far described which is applicable to the case where the additional gas contains oxygen, a fuel may be combusted (e.g. by direct firing) in the additional gas or mixture of additional gas and hot expander feed gas to increase its temperature and therefore its potential for generation of work in the expansion stage. The fuel may for example be methane, ethane, propane, butane, natural gas, or waste gas. With combustion of a fuel the inlet temperature to the expander will usually be in the range 500°-1500° C., e.g. 900°-1200° C.

In conventional processes such supplementary firing is not possible since there is no additional air provided and the air which leaves the reaction zone contains insufficient oxygen for combustion.

As an alternative to the firing of a fuel, it is possible for the additional gas or mixture of additional gas and hot expander feed gas to undergo an exothermic catalytic reaction with another gas to generate heat, a particular example being reaction with ammonia for removal of $NO_x$ gases in a nitric acid process.

In a second modification steam may be injected into the expander in which hot gas is expanded. This second modification is based on the incorporation of a Cheng cycle into the expander cycle. With this cycle, steam at high pressure is injected into the gas expander and is expanded with the heated gas to produce additional power.

A principal advantage of these two modifications, and particularly that of supplementary firing of fuel in the additional air, is that it allows the process heat to power ratio (i.e. the amount of the export heat as a ratio to the amount of net export power) to be changed to match or more closely match the requirements of the process site for which the work and heat is to be generated.

BRIEF DESCRIPTION OF THE DRAWINGS

The invention will be further described by way of example only with reference to the accompanying drawings, in which.

DETAILED DESCRIPTION OF THE INVENTION

Figure 1A:
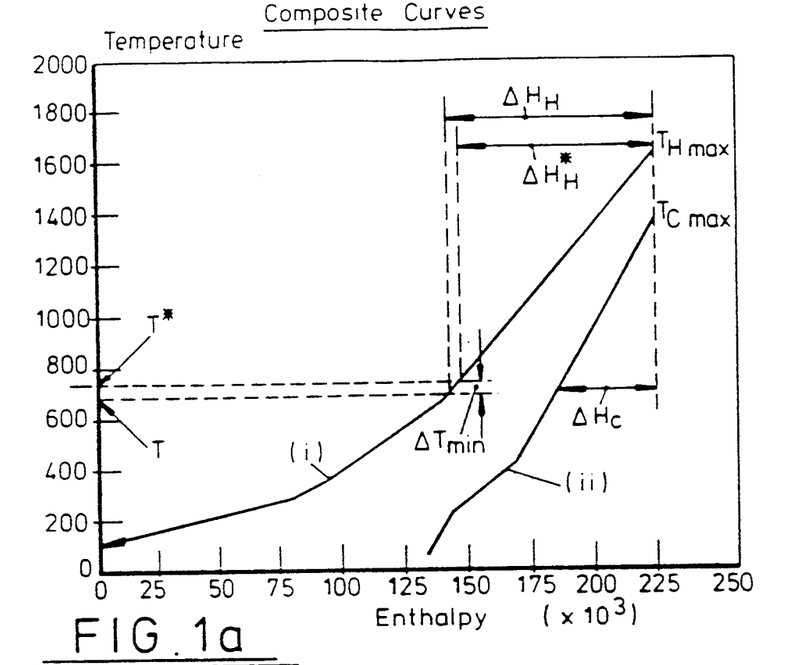
FIGS. 1(a) and (b) are typical Composite Curves and Grand Composite Curves for a prior art nitric acid process.

FIG. 1(a) is a curve obtained by Process Integration techniques for a typical $HNO_3$ production plant and illustrates operation of the process without production of pressurised steam for expansion to generate work. The curves illustrate what is meant by the term 'excess of high temperature heat'. Take the example process represented by the Composite Curves in FIG. 1a. Shown is a Composite Curve of process "hot streams" (curve (i)) which require cooling (i.e. can supply heat) and a Composite Curve of process "cold streams" (curve (ii)) which require heating. Collectively these two curves are termed the "process Composite Curves". This process has excess heat available at any given temperature level, say temperature T as shown, if the change in hot composite stream enthalpy between T and THmax ($\Delta H_H$) is greater in magnitude than the enthalpy change in the cold composite between $T$ and Tc max ($\Delta H_c$). To ensure that this excess heat transfer is physically feasible then there must be a minimum allowable temperature driving force between the heat supply (Hot Composite) and the heat demand (Cold Composite), say $\Delta T$min. The reference point on the Hot Composite thus must become $T^* = T + \Delta T$min instead of T. In this case the enthalpy change $\Delta H_H^*$ must be greater than $\Delta H_c$.

Figure 1B:
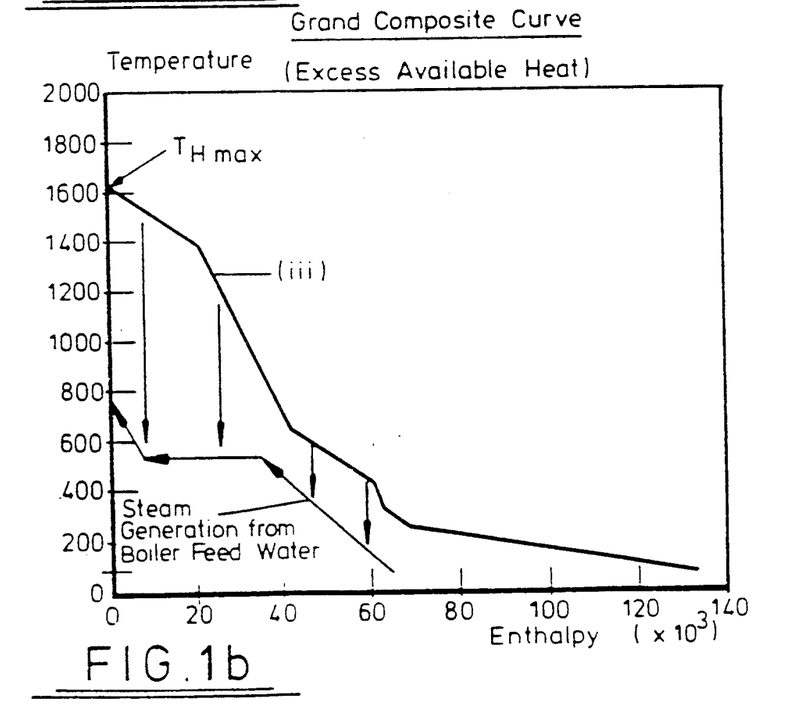

A profile of this excess available heat over the range of temperatures from Tambient to $T_H$max gives the so-called Grand Composite Curve (iii) in FIG. 1b. If the excess heat occurs at a sufficiently high temperature then it can be used for example to heat BFW to produce steam (FIG. 1b) for power production as shown in this diagram.

Figure 2:
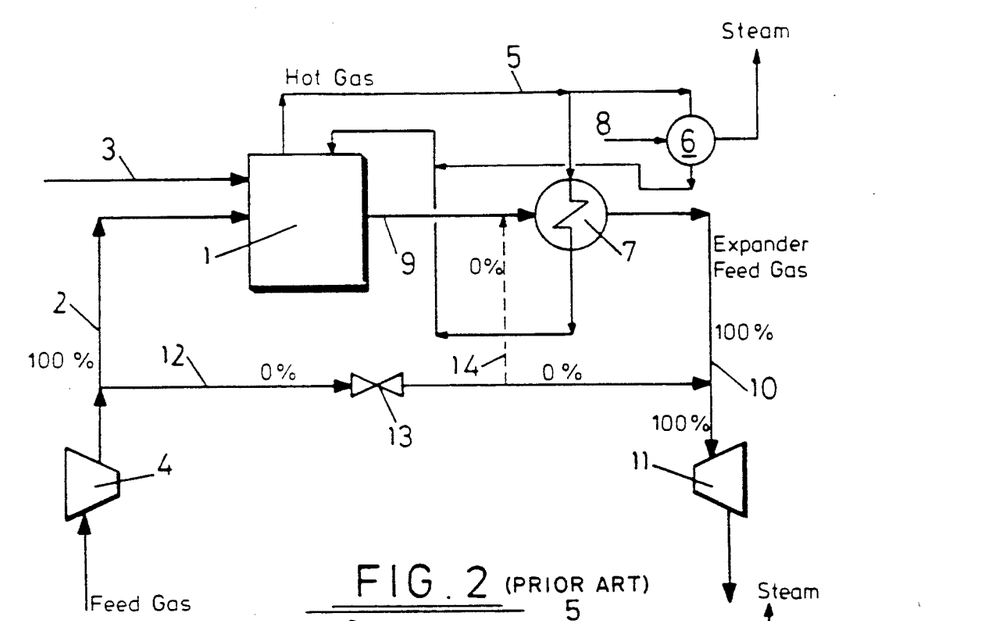
FIG. 2 is a flow sheet illustrating a typical prior art exothermic chemical reaction process operating under the full load condition and incorporating power generation by expansion of pressurised gas from the reaction.

Referring to FIG. 2, the illustrated flow chart includes an exothermic reaction process 1 (which incorporates a reactor, separation, utilities, the bulk of the heat recovery network, and other available heat sources) fed by pressurised reaction gases supplied along lines 2 and 3. Typically the exothermic reaction process will be an air based reaction and the gas supplied along line 2 will be air as pressurised by the compressor 4.

Hot gas produced in the reaction process 1 is fed along line 5 and directed to heat exchangers 6 and 7 before being returned to the reaction process 1. Boiler feed water is supplied along line 8 to heat exchanger 6 for the generation of steam whereas heat exchanger 7 is used to heat effluent gases (passed along line 9) from the reaction process before these gases are fed along line 10 to a power recovery turbine 11 for the generation of work. Within turbine 11 the hot effluent gases are expanded to a lower pressure, often atmospheric. It should be noted that the heat recovery exchanger sequences (i.e. 6 and 7) on the hot gas stream are illustrative only.

The illustrated flow sheet incorporates a gas by-pass line 12 downstream of compressor 4. Gas from line 12 may pass via a valve 13 directly into line 10 or, in an alternative embodiment, via a line 14 into line 9.

Under full load operating conditions of this prior art process, valve 13 is closed and compressor 4 provides the maximum amount (designated as 100%) of compressed feed gas which may be utilised in the reaction process. The expander feed gas is also indicated as a nominal 100%, indicating the maximum amount of gas which is to be fed to the expander 11. The amount of heat recovered into the expander feed gas stream (passing along line 10) is normally dictated by a limit on the inlet temperature of gases into the expander which is generally limited by material of construction considerations. However this figure is governed by the design or operating capacity of the heat recovery equipment 7. This is an important feature of existing designs.

Figure 3:
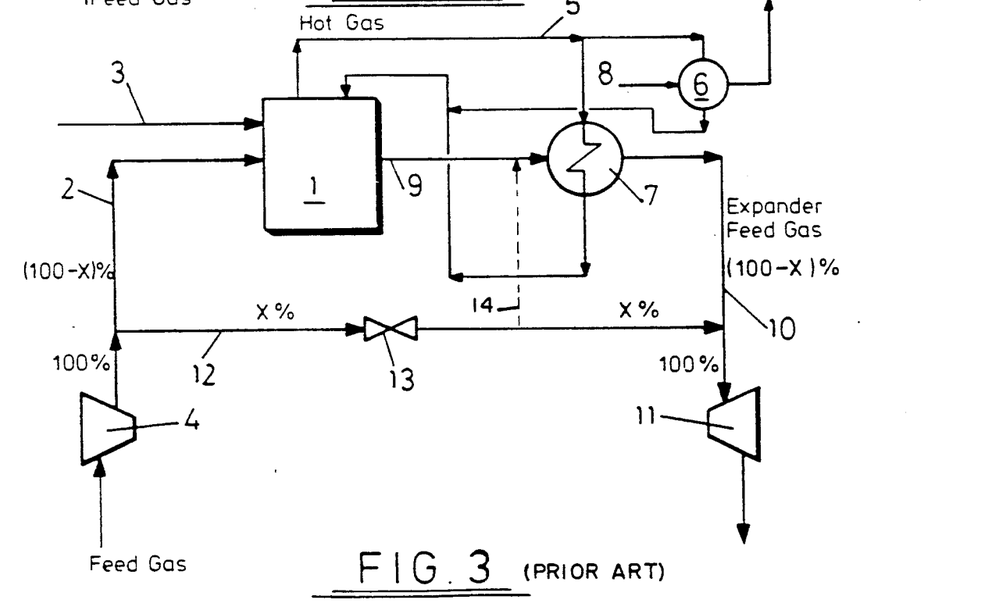
FIG. 3 is similar to FIG. 2 but illustrates the process operating under a 'turn down' condition.

If the plant throughput were to fall significantly below the full load condition (i.e. the plant is operating under a 'turn down' condition) the reduced amount of gas from reaction process 1 which could be fed to expander 11 may be such that a surge condition is generated in the latter. This problem may be avoided by continuing to compress the same amount of feed gas but opening valve 13 so that in the limiting case the flow rate to expander 11 is restored to the 100% condition (as illustrated in FIG. 3) in which X% of the feed gas passes through valve 13. Normally however the amount of gas fed to the expander under the turn down condition is less than the 100% limiting case and is just sufficient to keep the expander out of surge.

In the turn down condition, the gas passing through valve 13 is either injected directly into the expander 11 or passed along line 14 for heating in exchanger 7 prior to expansion. In the former case, the expander inlet temperature will be reduced resulting in a reduction of work generated. In the latter case, the following practices may be followed.

(a) If the temperature of the compressed by-pass gas (passing along line 14) is less than the existing temperature to the heat recovery system, the inlet temperature to the expander will fall and its work output will be reduced;

(b) If the temperature of the compressed by-pass gas is greater than the existing inlet temperature to the heat recovery system in stream 9 then, as dictated by the thermal performance of this equipment, the outlet temperature will rise provided this is permitted by the operating limitations of the expander. If this is permitted the expander power output will increase relative to the no by-pass case but this increase is strictly related to the outlet temperature of the compressor 4 and the thermal performance capability of the heat recovery equipment. If the increase in outlet temperature is not permitted then the compressed by-pass gas must be cooled before injection into the existing heat recovery equipment and no increase in expander work output will be obtained.

In all of the above cases, the same heat recovery equipment for heating the expander feed gases is used and the expander inlet temperature is determined by the thermal performance capability of this equipment. This equipment is designed so as to achieve the maximum allowable expander inlet temperature under 100% capacity (i.e. full load) design conditions. Design safety factors of 10-15% may sometimes be applied to the required heat transfer area to ensure guaranteed performance is met. However, the expander power output is still strictly determined by the actual performance of this equipment in conjunction with the total amount of gas available for expansion.

Figure 4:
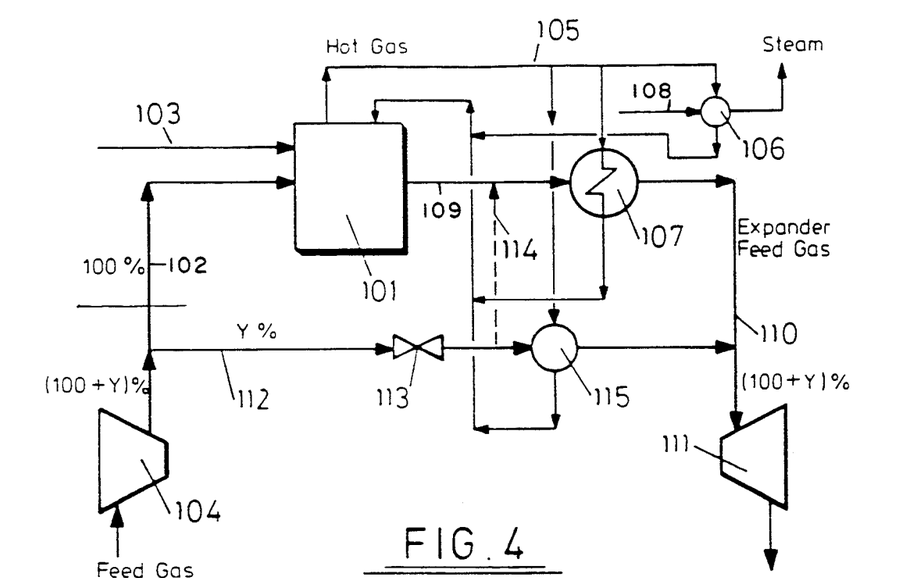
FIG. 4 is a flow sheet illustrating one embodiment of the invention operating under the full load condition.

Reference is now made to FIG. 4 which is a flow sheet of a process in accordance with the invention. There is an overall similarity with the flow sheet of FIG. 2 and those parts illustrated in FIG. 4 which are generally similar to an equivalent part in FIG. 2 are denoted by a reference numeral which is 100 greater than the equivalent FIG. 2 part. Thus, the exothermic reaction process is designated, in FIG. 4, by reference numeral 101.

There is however a number of important differences between the arrangement of FIGS. 2 and 4. In particular:

(a) compressor 104 and expander 111 are each of higher capacity than compressor 4 and expander 11 respectively;

(b) additional heat recovery capacity 115 is provided for by-pass gas; and (c) heat exchanger 106 is of lesser duty than exchanger 6.

The additional heat recovery capacity 115 may be provided by additional surface area on the prior art heat recovery equipment 7 or a new and separate heat recovery unit.

For the scheme of FIG. 4, the amount of gas supplied by compressor 104 will always be greater than the amount required for the full load operation of the plant. Under full load operation, a nominal 100% of gas passes to the reaction process and an extra amount Y % is continuously passed along the by-pass line 112. It should be stressed that this Y % is over and above the process reaction requirement. This by-pass stream (i.e. the additional gas) is heated by the excess high temperature heat and passed to expander 111. Thus the maximum allowable expander inlet temperature may be maintained by heating the additional gas to this limit. Consequently, the expander power output will always be greater than for the prior art process. The increase in power output will be directly proportional to the amount of additional gas (Y %) compressed above the 100% requirement for full load operation.

Figure 5:
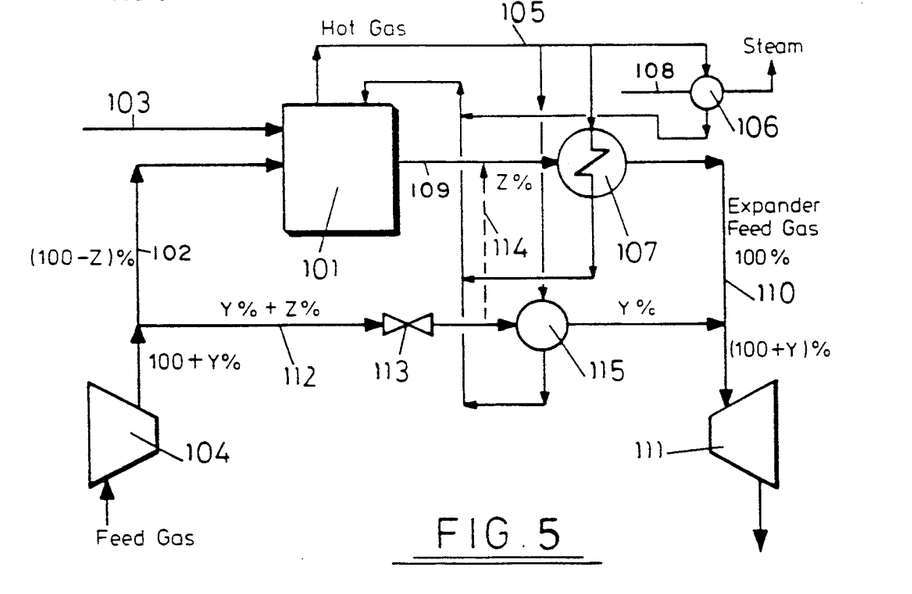
FIG. 5 is similar to FIG. 4 but illustrating operation of the process of the invention under a 'turn down' condition.

Under a 'turn down' condition (see FIG. 5) the amount of gas compressed is still (100+Y %) but the amount fed to reaction process 101 is reduced by Z % as compared to the full load condition. The extra Z % is passed along line 112 and either heated in the by-pass gas heat recovery system (115) to the maximum allowable expander inlet temperature if it has sufficient capacity, or it may be reinjected via line 114 into the inlet of unit 107 to achieve the same result.

In the prior arrangement of FIG. 2, the work generated by the expander, with or without the by-pass operational, is strictly limited by the thermal performance capacity of the heat recovery equipment on the expander gas feed stream 10 and the flow rate of this stream which is a direct output from the exothermic reaction process. The size of compressor 4 and the size of expander 11 are dictated by these restrictions.

With the invention, the gas flow to the expander 111 is independent of the process requirement at full or partial load conditions (i.e. Y % may be selected independently of process considerations up to a maximum value) and therefore the amount of heat input into the expander feed streams (and thus the power output of the expander) are independent of the restrictions mentioned in the last paragraph. The value of Y % can thus be increased according to economic favourability up to the thermodynamic limit of the ability of the process to supply excess heat of reaction to the gas by-pass stream.

The additional heat supply to the gas by-pass stream is made at the expense of the amount of excess heat available for steam generation. However under certain thermal conditions the net additional power output from such a system can be increased, i.e. additional expander power output minus additional by-pass gas compression is greater than the lost power output due to decreased potential for steam raising and generating work therefrom.

Although the flow sheets of FIG. 2 (prior art) and FIG. 4 (invention) are diagrammatically similar, they are fundamentally different in concept. The prior art arrangement is designed in terms of the capacity of compressor 4, capacity of expander 11, and heat recovery capacity for the expander feed gas such that the upper limit of the gas flow through the compressor and/or expander occurs at the full load throughput. In the invention there is additional compressor, expander and heat recovery capacity above this throughput to exploit the thermodynamic favourability of providing work output by expansion of heated pressurised gas in preference to steam generation and expansion.

In the event of plant light load operation with the invention ('turn down' condition) to which reference has already been made (FIG. 5), the amount of expander feed gas is still maintained above 100% capacity throughput and at the maximum allowable temperature for injection to expander 111. Thus power output from the expander is maintained.

Various modifications to the arrangement of FIG. 4 are shown in FIGS. 6–10.

Figure 6:
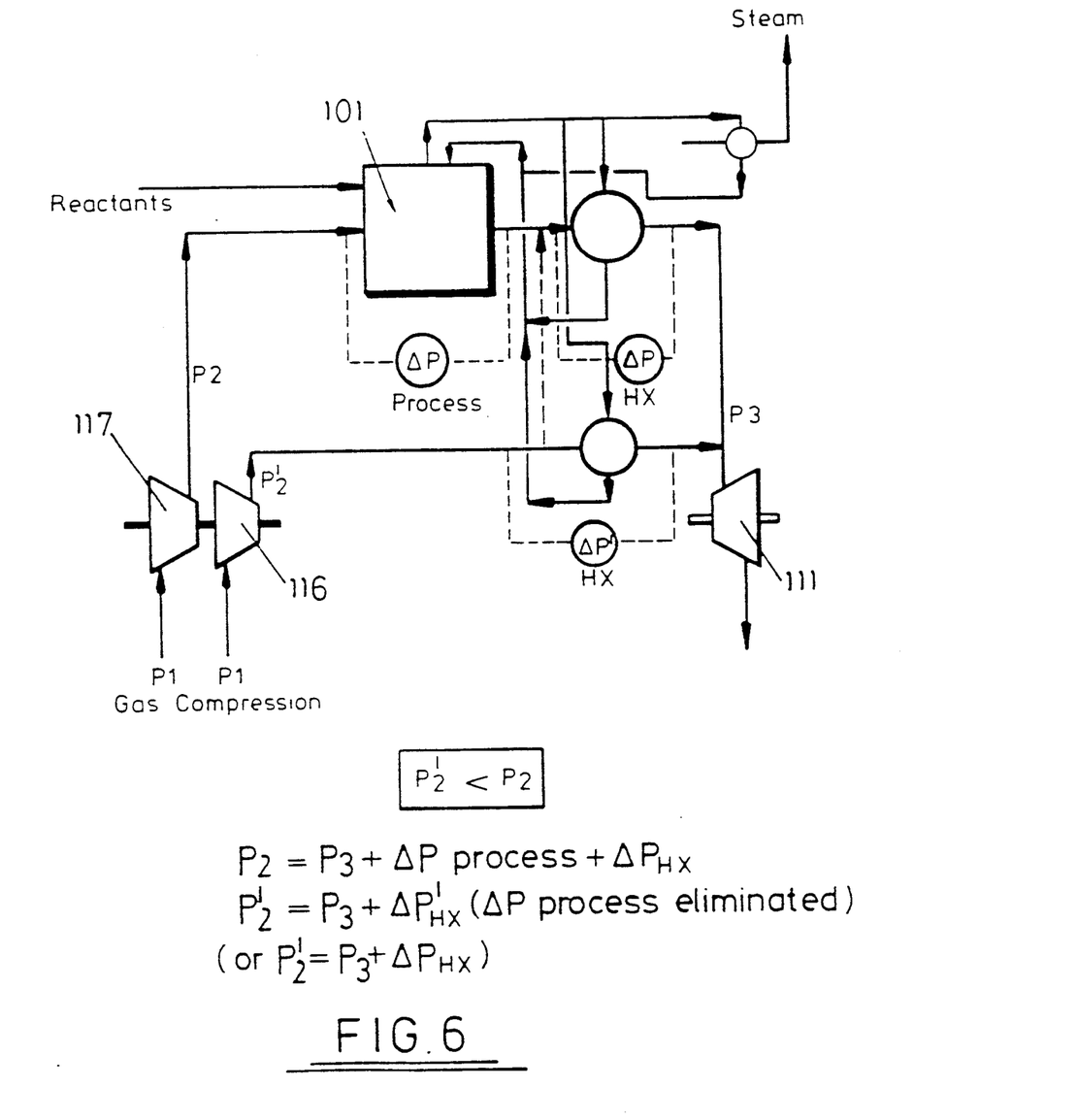
FIGS. 6-10 illustrate modifications of the flow sheet of FIG. 4.

An inefficiency of the arrangement of FIG. 4 is that the use of the single compressor 104 means that all of the feed gas and by-pass gas is compressed to the pressure required by the reaction process 101 whereas there will be a pressure drop (P process) across this process which means that the additional gas (Y %) need not be compressed to such a high pressure. In the arrangement of FIG. 6, the additional gas is supplied at a pressure $P^1_2$ by a secondary compressor 116, the gas for the reaction being supplied at a pressure $P_2$ by a primary compressor 117 (where $P^1_2 < P_2$). The bottom three lines of FIG. 6 show that $P^1_2$ is independent of $\Delta P$ process and thus overall power efficiency is improved relative to FIG. 4.

Figure 7:
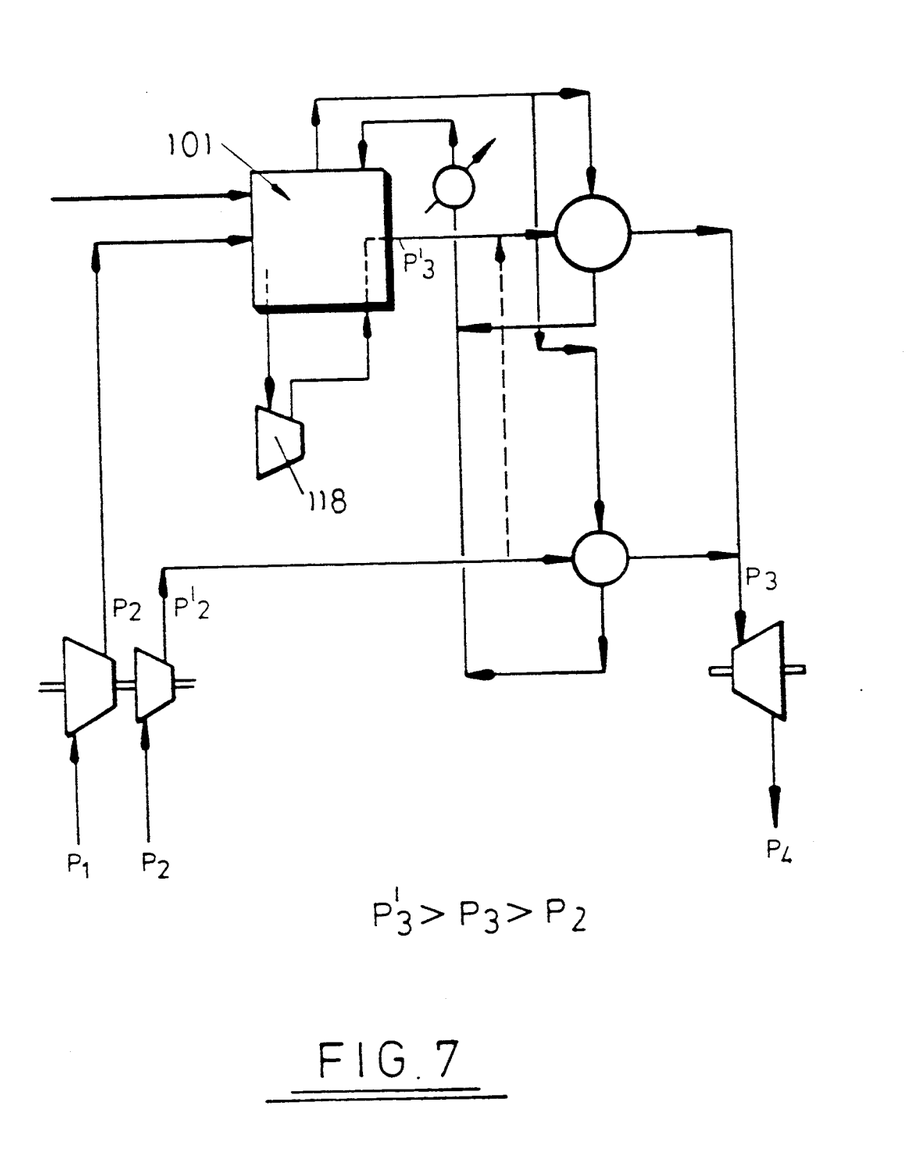
Figure 8:
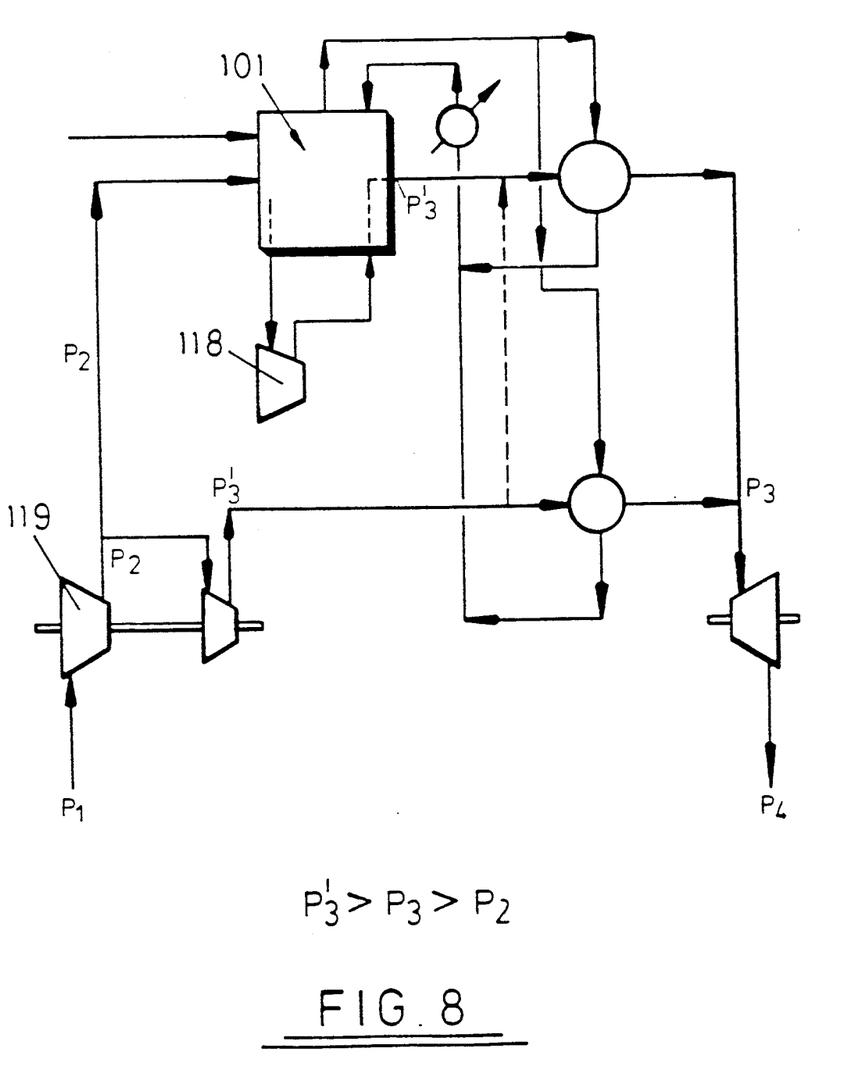

Such an arrangement can also be used in processes with internal compression where the effluent gas exit pressure $P^1_3$ from the process is higher than the primary gas inlet pressure $P_2$. This is shown diagrammatically in FIG. 7 in which the internal compression is provided by a compressor 118. Alternatively, in a process with internal compression, the gas compression could be performed using an enlarged primary compressor 119 to the feed pressure $P_2$ and a second stage of compression for the additional gas from the feed pressure to the effluent gas exit pressure as shown in FIG. 8.

Figure 9:
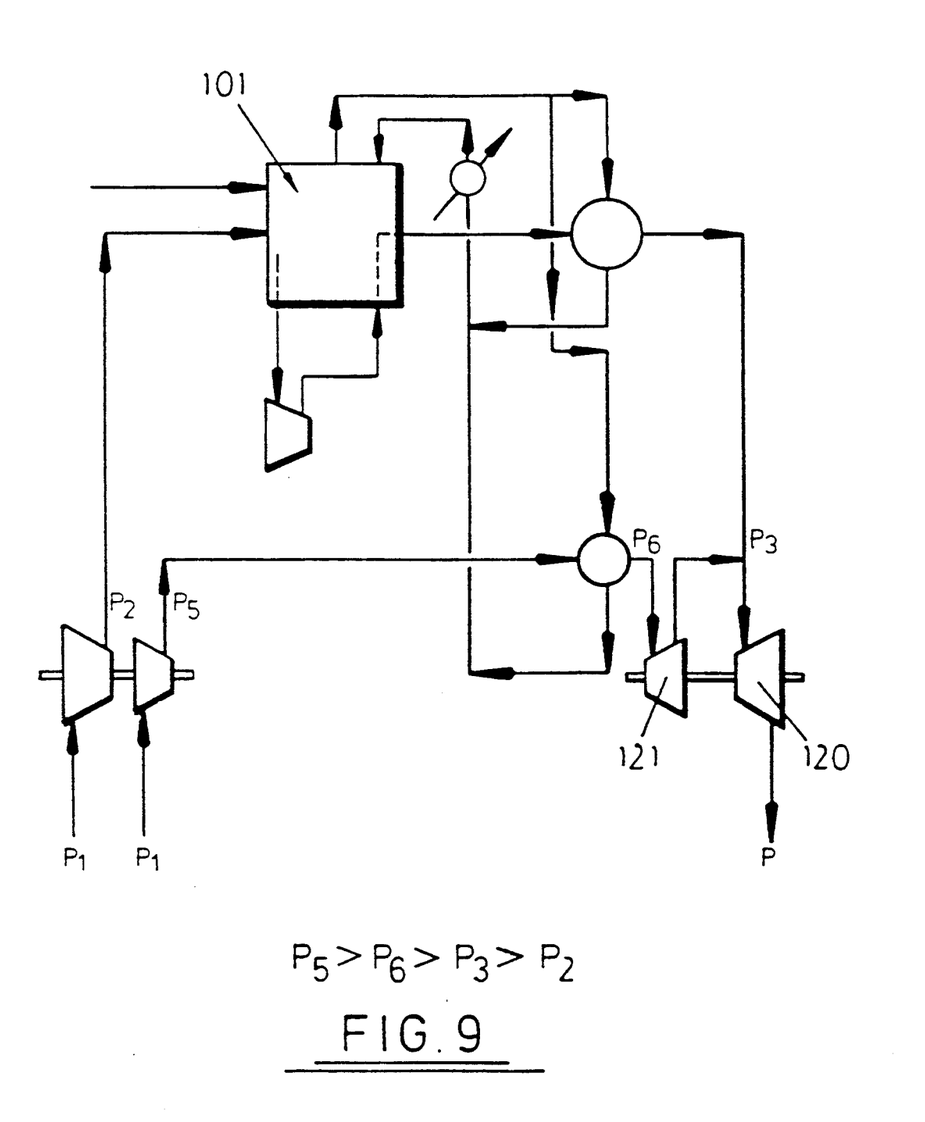
Figure 10:
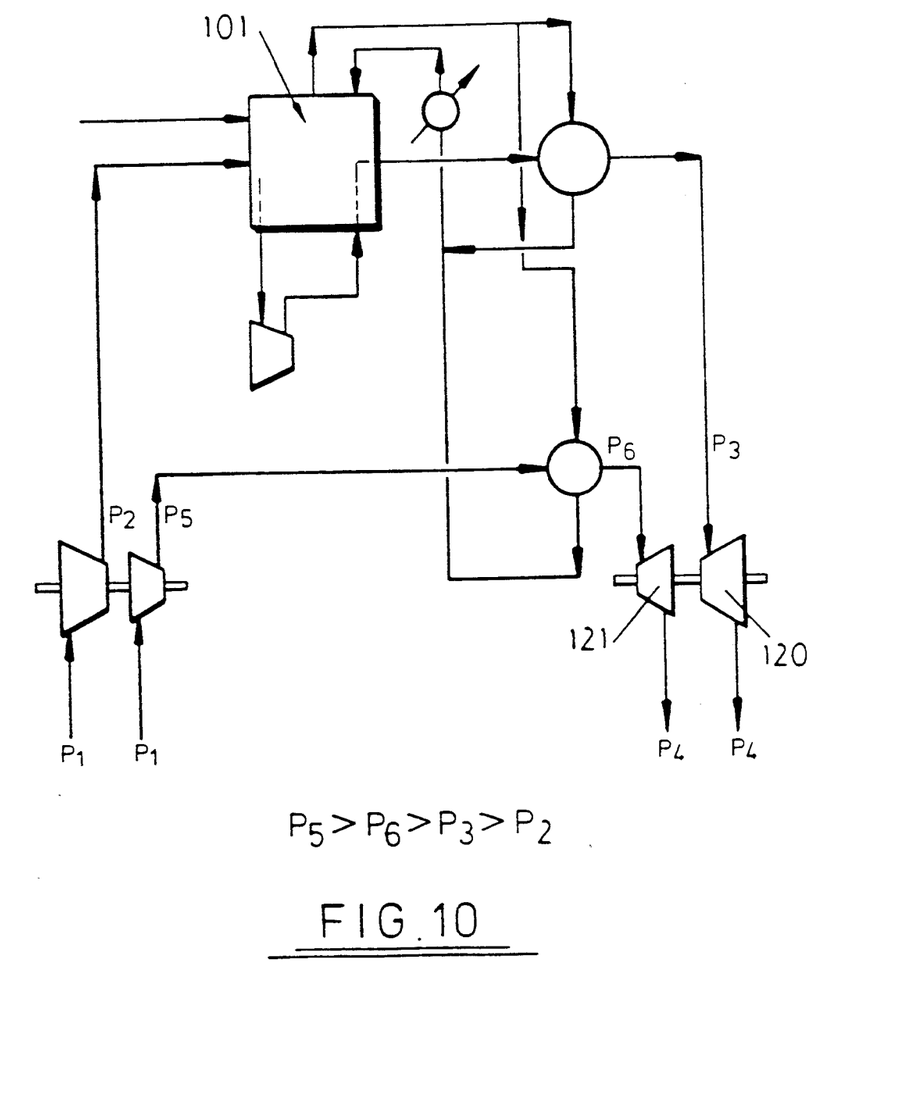

A further important variation of the above schemes is presented in FIG. 9. In this configuration the additional gas is compressed to a pressure $P_5$ significantly higher than the pressure $P_3$ at the inlet of expander 120. In this manner the secondary gas can be heated at a pressure which is decoupled from what may be an unsuitable effluent gas exit pressure from the process. The heated gas then undergoes a first stage of expansion in expander 121 down to the effluent gas expander inlet pressure before introduction to the expander 120. An alternative expansion scheme is shown in FIG. 10 where effluent gas and the additional gas undergo separate expansion without mixing.

As a more specific example of one embodiment of the generic flow sheets described above, consider the flow sheet shown in FIG. 11. This is typical of a nitric acid plant amongst others. It is similar to the generic flow sheet in FIG. 7 but without the additional gas compression (i.e. without the invention). The feed gas and additional gas are both air.

Figure 11:
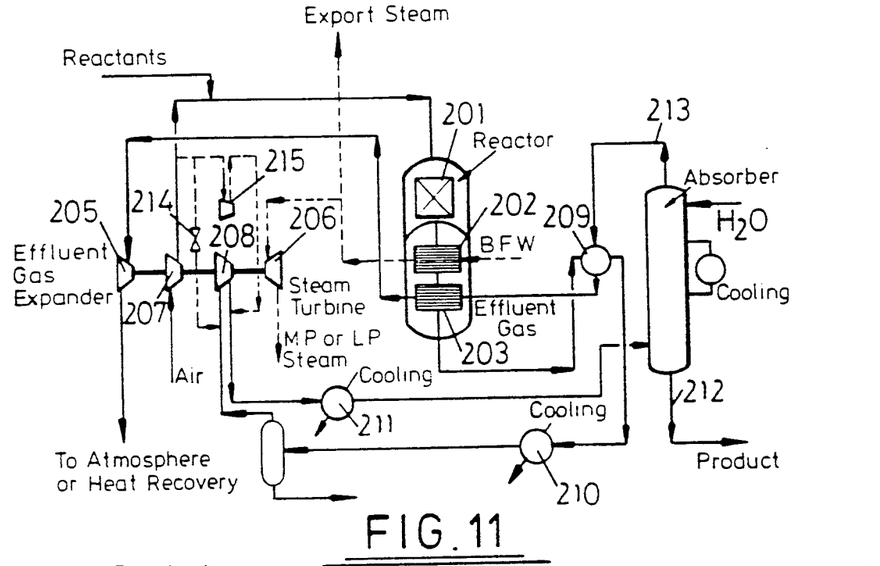
FIG. 11 illustrates a prior art nitric acid process.

The principal features of the apparatus of FIG. 11 are a reactor 201, heat exchanger components 202 and 203, an absorber 204, an effluent gas expander 205, a steam turbine 206, and compressors 207 and 208 (driven by work derived from expander 205 and turbine 206). The heat exchanger network employed is meant to be illustrative only with its true arrangement determined by proper integration techniques.

In operation of the process, air pressurised by compressor 207 is mixed with the reactants before passing to reactor 201 where the exothermic catalytic reaction takes place. The hot gases produced by the reaction (referred to herein as the product gases) pass through heat exchangers 202 and 203 and then via further heat exchangers 209 and 210 before separation and passing to compressor 208. After compression, the product gases are cooled (here in exchanger 211) and enter the base of absorber 204 into the top of which is introduced water for absorption. An aqueous product stream leaves absorber 204 along line 212 whereas the scrubbed, cool effluent gases leave the absorber along line 213 before passing sequentially through heat exchangers 209 and 203 and then to expander 205.

The tail gases leaving absorber 204 will be at a lower temperature than the product gases produced in reactor 201 so that the tail gases are heated (by heat exchange with the product gases) during their passage through heat exchangers 209 and 203. Next, the heated tail gases pass to expander 205 in which gas expansion yields work for driving compressors 207 and 208. After expansion, the tail gases may be vented to atmosphere or integrated back into the process if beneficial to heat recovery and overall economics.

Additionally, boiler feed water (BFW) passes through heat exchanger 202 to generate high pressure steam, part of which may be used to produce the supplementary work for driving compressors 207 and 208 via steam turbine 206, the remainder of which is exported for use elsewhere within this plant complex. Medium or low pressure steam is discharged from turbine 206 for possible use elsewhere within the plant, or is condensed.

It should be appreciated that although heat exchangers 202 and 203 are illustrated as physically distinct units with reaction gas passing sequentially from exchanger 202 to exchanger 203, they may in fact be part of a more complex heat exchange unit in which this sequence is not necessarily obeyed. This may be necessary to achieve target outlet temperatures for the tail gas and steam consistent with process constraints and effective use of heat exchange surface area.

These prior art dual pressure nitric acid processes do not normally use any by-pass facility during normal (or 'full load') operation. During plant 'turn down' situations i.e. when reduced nitric acid production rate is required, the expander 205 may be protected from surge by diverting excess air through a valve 214 into the suction of compressor 208 to maintain the effluent gas rate at the expander inlet. Alternatively a 'booster compressor' 215 may be employed for the same purpose. Normally this compressor is not operational and is used only in light load (or 'turn down') conditions.

Figure 12:
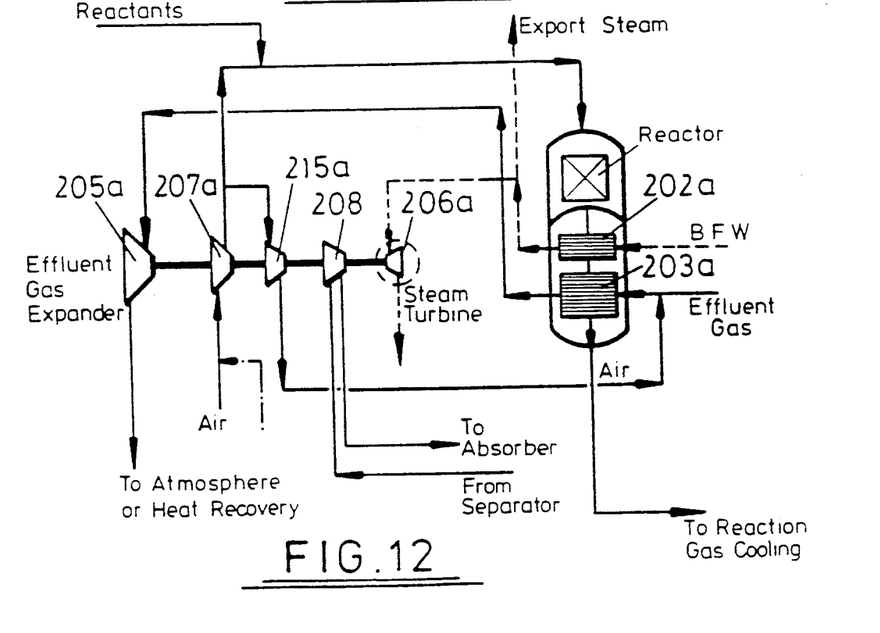
FIG. 12 illustrates a nitric acid process embodying the invention.

FIG. 12 illustrates a portion of the apparatus of FIG. 11 but modified in accordance with one embodiment of the invention as in FIG. 8. Like parts of FIGS. 11 and 12 are designated by the same reference numerals in some cases suffixed (in FIG. 12) with the letter 'a' to denote that part is of a different capacity or size from the equivalent part shown in FIG. 11. It will be seen that the arrangement of FIG. 12 incorporates a compressor 215a for compressing the additional air to be fed to expander 205a.

The process of the two cases (FIGS. 11 and 12) are discussed and compared in detail below, with specific reference to nitric acid production.

The processes can both be represented thermodynamically using Pinch Technology techniques by composite hot and cold curves. These are constructed at the flow rate representing the fully loaded (i.e. 100% capacity) throughput as normally determined by plant design flow sheet specifications (e.g. guaranteed plant throughput capacity) or actual operating experience capacity. This capacity is normally specified in terms of the production rate of nitric acid on a dry (i.e. water free) basis.

Figure 13A:
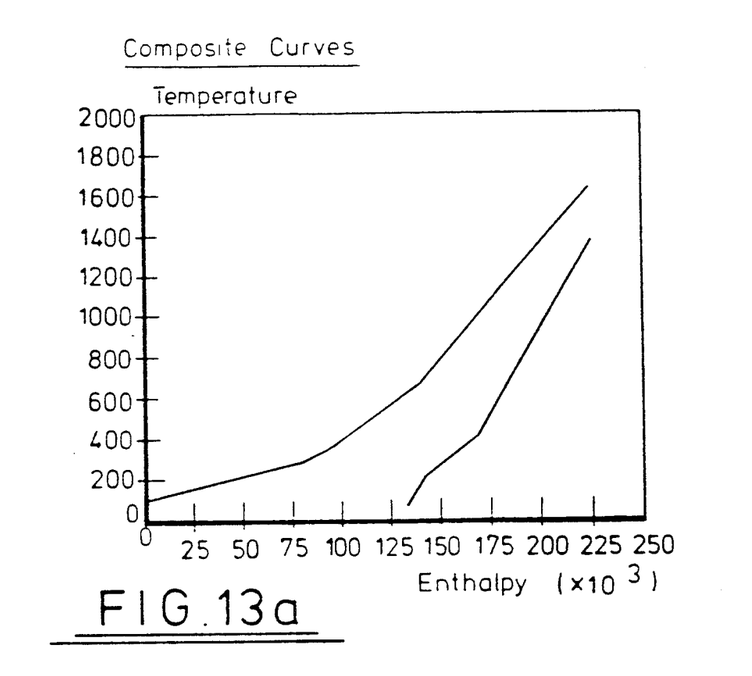
FIGS. 13a and 13b are typical Composite Curves for a prior art nitric acid process.
Figure 13B:
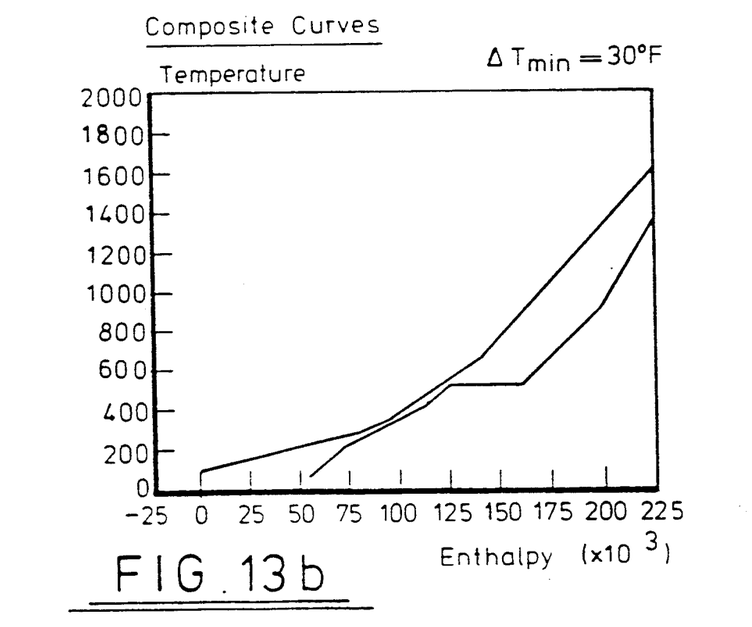

For the 'prior art' case typical composite curves appear as shown in FIGS. 13a and 13b. Included in FIG. 13b is the heating requirement for steam generation required to balance the excess process heat available for power generation purposes. This steam generation is maximised up to the point where it causes the two composite curves to approach one another at some specified (or optimised) minimum allowable approach temperature ($\Delta T$ min). This fixes the maximum possible steam production.

At this capacity condition the so-called reaction air requirement can be defined within a very narrow range of acceptable flow rates. All modern plants are designed to achieve conversion efficiencies between 94%–98%. This can only be achieved with a narrow band of acceptable ammonia/air feed mass ratios. Typically this is about 0.06/1.0. The associated air inlet rate to the reactor plus bleaching air (for reaction with $NO_x$ gases) at 100% capacity is defined as the 'process air requirement'. This will also fix the tail gas flow rate from the absorber to a narrow band of values typically around 0.87 times that of the process air flow rate.

The above described flow rates will determine the design capacity and hence the installed capacity of the associated air compressor and tail gas expander. Any difference between required compressor and expander horsepower and installed horsepower will be due to design safety margins or equipment 'frame-size' considerations. Rarely would it be expected that installed capacity differed by more than 10% above design requirements.

The said air and effluent gas flow rates will also determine the design basis for the tail gas heat recovery unit (exchanger 203). Again, some design safety margin may have been installed on this unit above the calculated area requirement to ensure guaranteed performance specifications are met. Typically, this safety margin may be 10% to 15%. It will be designed to achieve an outlet temperature equal to the maximum allowable expander inlet temperature.

The by-pass (or recycle) stream for current state of the art plants is only operated when the required plant nitric acid production rate is significantly less than its capacity. The ammonia feed rate must be reduced, and to maintain acceptable reactor yields (and safe operating conditions) the air feed rate to the reactor must be reduced. This reduces the effluent gas flow rate to the expander accordingly. This may necessitate the opening of the by-pass line to divert air from the air compressor discharge to the tail gas heat exchanger inlet and thence to the expander to prevent surge. The plant operator may also choose to maintain the air compressor operating at or near its capacity and divert the air not required for reaction into the by-pass line. The ability to divert air into this by-pass line will be limited either by:

(a) the air compressor capacity; or
(b) the expander inlet flow capacity.

In either case, the gas outlet temperature from the heat exchanger can be no higher than the allowable maximum inlet temperature to the expander. This implies that the gas expander power output can be no higher than that when operating at 100% capacity with the by-pass closed.

For the process with invention there are several major differences in equipment and flow sheet design bases (and hence installed size) and in basic operating philosophy. The extent of these differences will depend on the percentage of 'additional air' (as previously defined) found to be economically attractive to consider. In theory however this additional air may be as high as approximately 75% of the abovementioned process air requirement. Using this as a limiting example, the effect would be as follows for any given plant nitric acid production capacity:

(i) The booster compressor 215a will be approximately 6–8 times larger than compressor 215;
(ii) The air compressor 207a would have approximately 75% higher capacity than compressor 207;
(iii) The effluent gas expander (205a) throughput capacity would be approximately 95% higher than for expander 205;
(iv) The steam turbine (206a) would be approximately 25% the capacity of steam turbine 206;
(v) The design duty of heat exchanger (203a) would be approximately twice that of exchanger 203;
(vi) The design duty of heat exchanger (202a) would be approximately 25% of exchanger 202;

(vii) The by-pass line would be operational under all process load conditions to maximise heat input into the expander gas inlet stream at a rate determined by the ability of the exothermic reaction to heat the expander inlet gas to the maximum allowable temperature, independently of the reactor air requirement.

This introduction of compressed air into the effluent gases results in a greater flow of gas through heat exchanger 203a than through exchanger 203. Heat exchanger 203a is of larger heat exchanging capacity than exchanger 203 and the difference in this capacity is such as to allow the greater amount of gas flowing through 203a to be heated to the same temperature as the gas flowing through exchanger 203. The increased heat duty requirement of exchanger 203a is allowed for by a corresponding reduction in heat exchanging capacity of exchanger 202a (as compared to exchanger 202).

The gases leaving heat exchanger 203a now pass to the gas expander 205a. Since there is a greater mass of flow of these gases than those exiting from exchanger 203, a greater amount of work is obtained from gas turbine 205a.

As indicated above, heat exchanger 202a has a lower heat duty than heat exchanger 202. Consequently the steam generating capacity for this modified system of FIG. 12 will be reduced relative to that of FIG. 11. However, provided appropriate inlet temperatures to the gas turbine 205a are used then the increase in expander work output as a result of increased throughput will exceed the additional power required for the additional air compression. This will enable a reduction in power requirement for the steam turbine with a consequent reduction in size and steam consumption.

Furthermore, at some appropriate inlet temperature to the expander, the decrease in steam requirement for the steam turbine will exceed the decrease in steam production from the steam generator (exchanger 202a). In this event the modified process of FIG. 12 will be generating more export steam than that shown in FIG. 11. This is equivalent to an increased power export in the usual case where this steam is utilised for power generation. As the quantity of by-pass air is increased the steam turbine 206a will be eliminated. Further increases in air rate will reduce steam export but increase power export via gas expansion. The alternative configurations shown in FIGS. 7, 9 and 10 are applicable to this particular example.

Figure 14A:
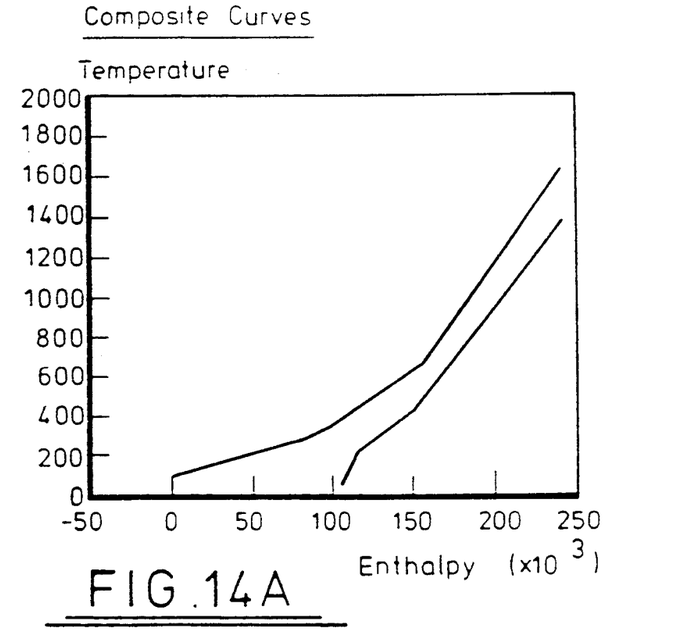
FIGS. 14a and 14b are Composite Curves for a nitric acid process embodying the invention.
Figure 14B:
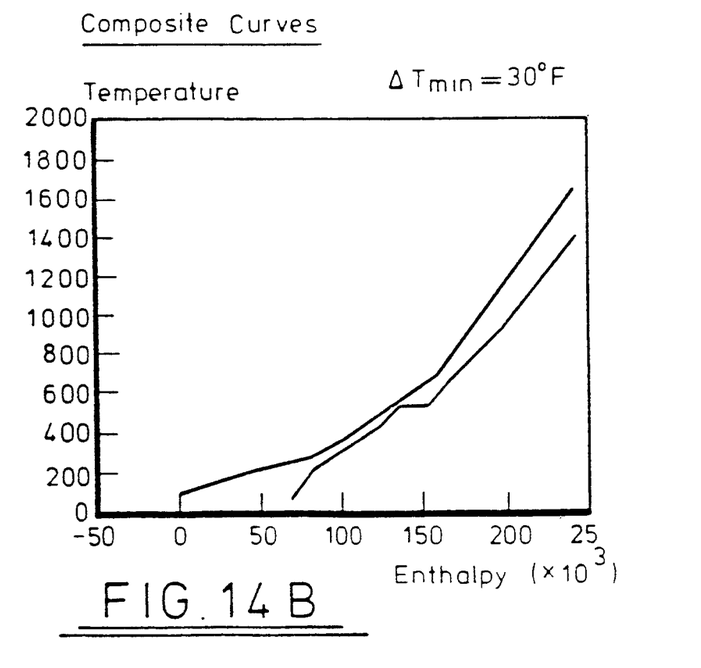

A representative set of Composite Curves for the process of FIG. 12 is presented in FIGS. 14a and 14b and can be seen to be significantly different to that for the 'prior art' process (FIGS. 13a and 13b).

Although this example illustrates a limiting case for the application of the invention, it does nonetheless illustrate how the plant desinged with the invention can have a completely different heat recovery network, different gas compression and gas expansion system, different steam raising and expansion system, and hence a very different power generation characteristic than plant designs not utilising the invention.

The invention relieves the restriction caused by the current design practice of limiting air compressor, tail gas expander and tail gas heat recovery equipment capacities to that determined by supplying only the air required by the process at 100% capacity.

1) Without this additional gas, the amount of power that can be produced by effluent gas heating and expansion is limited by the amount of process effluent gas. Often, due to the reduced mass flow rate of effluent gases relative to feed (due to product removal) and a restriction on the expander inlet temperature achievable (by material of construction or reaction temperature considerations), more high temperature reaction heat is available to put into this effluent stream than it is possible to absorb. Additional gas introduction overcomes this restriction.

2) The ability to mix the additional gas at any convenient point in the process enables the evaluation of the thermodynamic and economic incentive to introduce this gas to be decoupled from the process pressure and temperature restrictions normally governing effluent gas expansion. That is, the additional gas discharge pressure, expander inlet temperature etc., can be made quite independent of considerations for the process effluent gas stream. This may enable a wider and more economically promising range of conditions to be studied. Indeed it may even lead to alteration of process conditions themselves so that a more economically favourable overall process system is realised.

3) The invention takes maximum advantage of the existing power generation scheme whether in new design or in the retrofit of existing plants. This is because the invention effectively superimposes on the existing power generation structure thus eliminating fixed or base costs and allows costing of incremental power production using incremental (marginal) cost economics. In modification of a new design, the incremental power produced is achieved chiefly by adding incremental horsepower to the gas compressor, incremental horsepower to the gas expander and incremental heat exchanger surface area for the additional air heating whilst removing incremental horse power from the steam turbine and decreasing the size of the associated steam generation equipment.

4) The invention can give much higher export power/export steam ratios than for prior art plants and can tailor this ratio to suit site power/heat ratios much more than currently possible. Operationally it can improve flexibility in meeting varying site power/heat demands by simply varying the additional air rates.

Consider a model prior art Nitric Acid process. Assume that after consideration of economic capital and energy trade-offs, a minimum temperature approach of 30° F. for the associated composite curves is found to be optimal for the conventional process. Assume that the following process and equipment operating parameters apply:

Tail Gas Expander:
Isentropic efficiency—85%
Inlet pressure—148 psia (10.2 bar a)
Outlet pressure—15.2 psia (1.05 bar a)
Maximum allowable inlet temperature—1373° F. (745° C.)
Tail Gas rate=231,880 lb/hr (105,180 kg/hr)
MW1=28.192
Primary Air Compressor:
Isentropic efficiency—80%
Inlet temperature—59° F. (15° C.)
Inlet pressure—14.7 psia (1.01 bar a)
Discharge pressure—47 psia (3.24 bar a)
Compression in 2 stages with intercooling to 86° F. (30° C.)

Air rate = 294,740 lb/hr (133,693 kg/hr)
Steam System:
Steam generated at 856 psia (59 bar a), 932° F. (500° C.)
Turbine exhaust pressure = 145 psia (10.0 bar a)
Isentropic efficiency = 75%

The conventional plant has the following compression and power consumption characteristics
Primary air compression = 7075 HP (5275 kw)
Expander power output = 17,130 HP (12775 kw)
Steam generation = 54,600 lb/hr (24,766 kg/hr)
Power output = 3415 HP (2545 kw)

There is an additional process compression requirement for intermediate reaction product gases (so called $NO_x$ compression) which is fixed. This shall be taken as 6000 HP.

Thus net plant power export = Expander output + steam turbine output − Primary air compression − $NO_x$ compression = 17130 + 3415 − 7075 − 6000 = 7470 HP (5570 kw)

Consider now this same Nitric Acid process at the same Nitric Acid production rate only with the invention. For illustrative purposes the by-pass flow rate has been chosen as an additional 50% above the primary air compression rate. By-pass air compression is achieved in two stages with intercooling to 86° F. to both stages.
Discharge pressure = 152.3 psia (10.5 bar a)
Isentropic efficiency = 80%
Secondary air rate = 147,370 lb/hr (66,845 kg/hr)

The compression and power consumption characteristics for this modified process can be calculated to yield the following results.
Primary air compression = 10610 HP (7910 kw)
Secondary air compression = 3600 HP (2685 kw)
Expander power output = 27,880 HP (20,750 kw)
Steam production = 25,500 lb/hr (11,566 kg/hr)
Power output = 1610 HP (1200 kw)
$NO_x$ compression = 6000 HP (4475 kw)
Net power output for modified plant = 27,830 + 1610 − 10610 − 3600 − 6000 = 9230 HP (6880 kw)

Thus the implementation of the invention has allowed an increase in power production from the process of 1760 HP (1310 kw) or 23.6% of the original power output capability.

We claim:

1. An exothermic chemical process carried out above atmospheric pressure, said process comprising the steps of:
    passing a first pressurized gas stream from the process and a second pressurized fluid stream containing an excess of high temperature heat from the process through a heat exchanger to heat said first pressurized gas with a portion of said excess high temperature heat;
    expanding said heated first pressurized gas to generate work;
    passing an additional amount of pressurized gas and at least a portion of said second pressurized fluid stream through a heat exchanger to heat said additional amount of pressurized gas with another portion of said excess high temperature heat contained in said second pressurized fluid stream, said additional amount of pressurized gas being independent of the amount required by the process; and
    expanding said heated additional amount of pressurized gas to generate work;
    said additional amount of pressurized gas being such that the total amount of gas expanded is greater than the amount of gas which would have been available for expansion without supplying the additional amount of pressurized gas.

2. An exothermic chemical process carried out above atmospheric pressure, said process comprising the steps of:
    passing a first pressurized gas stream from the process and a second pressurized fluid stream containing an excess of high temperature heat from the process through a heat exchanger to heat said first pressurized gas with a portion of said excess high temperature heat;
    expanding said heated first pressurized gas to generate work;
    passing an additional amount of pressurized gas and at least a portion of said second pressurized fluid stream through a heat exchanger to heat said additional amount of pressurized gas with another portion of said excess high temperature heat contained in said second pressurized fluid stream, said additional amount of pressurized gas being independent of the amount produced by the process; and
    expanding said heated additional amount of pressurized gas to generate work;
    said additional amount of pressurized gas being such that the total amount of gas expanded is greater than the amount of gas which would have been available for expansion without supplying the additional amount of pressurized gas.

3. A process as claimed in claim 1 or 2, wherein all of said second pressurized fluid stream containing an excess of high temperature heat is passed through a single heat exchanger to heat said first pressurized gas stream and said additional amount of pressurized gas.

4. A process as claimed in claim 1 or 2, wherein a first portion of said second pressurized fluid stream containing an excess of high temperature heat is passed through a first heat exchanger to heat said first pressurized gas stream and a second portion of said second pressurized fluid stream is passed through a second heat exchanger to heat said additional amount of pressurized gas.

5. A process as claimed in claim 1 or 2, wherein the additional amount of pressurized gas is such as to increase the gas available for expansion by at least 10% as compared to the case where no additional gas is provided.

6. A process as claimed in claim 23, wherein the additional amount of gas is such as to increase the gas available for expansion by at least 20% as compared to the case where no additional gas is provided.

7. A process as claimed in claim 5, wherein the additional amount of gas is such as to increase the gas available for expansion by 20 to 100%.

8. A process as claimed in claim 1 or 2, wherein the gas to be expanded is at a temperature of 500°–1500° C.

9. A process as claimed in claim 26, wherein the gas to be expanded is at a temperature of 600° to 850° C.

10. A process as claimed in claim 1 or 2, wherein the gas of said additional amount of pressurized gas is the same as a feed gas for the reaction.

11. A process as claimed in claim 1 or 2, wherein hot gas leaving the exothermic process is at a lower pressure than a feed gas and wherein said additional amount of gas is pressurized to a pressure less than that of the feed gas.

12. A process as claimed in claim 1 or 2, wherein hot gas leaving the exothermic process which is to be expanded is at a higher pressure than a feed gas, and wherein said additional amount of gas is pressurized to a pressure higher than that of the feed gas.

13. A process as claimed in claim 12, wherein the additional gas is compressed firstly to the same pressure as the feed gas and subsequently further pressurized prior to heating and expansion.

14. A process as claimed in claim 1 or 2, wherein the reaction is an oxidation reaction with air as a feed gas and said additional amount of pressurized gas is also air.

15. A process as claimed in claim 13, wherein the reaction is the oxidation of ammonia in the production of nitric acid.

16. A process as claimed in claim 15, wherein said additional amount of air is 20-75% of the air required by the plant for operation at full load condition.

17. A process as claimed in claim 1 or 2, wherein said additional amount of gas is expanded separately from hot gas from the reaction process.

18. A process as claimed in claim 1 or 2, wherein said additional amount of gas is expanded in a first a stage separately from hot gas from the reaction, and then expanded in a second stage with said hot gas.

19. A process as claimed in claim 1 or 2, wherein the said additional amount of gas is air and a fuel is combusted in the additional air or mixture of additional gas and hot gas from the reaction prior to expansion.

20. A process as claimed in claim 1 or 2, wherein steam is admixed with the hot gas to be expanded.

21. A process as claimed in claim 1 or 2, wherein said additional gas is air and an admixture of this gas and hot gas from the reaction is reacted with a fuel in a catalytic exothermic reaction.

* * * * *